United States Patent
Tang

(10) Patent No.: US 10,247,973 B2
(45) Date of Patent: Apr. 2, 2019

(54) LIQUID CRYSTAL DISPLAY, LIQUID CRYSTAL DISPLAY PANEL AND MANUFACTURE METHOD THEREOF

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 181 days.

(21) Appl. No.: 15/312,209

(22) PCT Filed: Sep. 14, 2016

(86) PCT No.: PCT/CN2016/098942
§ 371 (c)(1),
(2) Date: Nov. 18, 2016

(87) PCT Pub. No.: WO2018/018722
PCT Pub. Date: Feb. 1, 2018

(65) Prior Publication Data
US 2018/0180926 A1    Jun. 28, 2018

(30) Foreign Application Priority Data

Jul. 28, 2016 (CN) .................. 2016 1 06065297

(51) Int. Cl.
G02F 1/1333 (2006.01)
G02F 1/133 (2006.01)
(Continued)

(52) U.S. Cl.
CPC ...... *G02F 1/133308* (2013.01); *G02F 1/1333* (2013.01); *G02F 1/13306* (2013.01);
(Continued)

(58) Field of Classification Search
CPC ......... G02F 1/133308; G02F 1/133528; G02F 1/1333; G02F 1/13306; G02F 1/133514; G02F 1/1362; G02F 2001/133354
(Continued)

(56) References Cited

U.S. PATENT DOCUMENTS

2007/0165170 A1* 7/2007 Fukuda ................. G02F 1/1333
349/138
2017/0162825 A1   6/2017 Xiao et al.

FOREIGN PATENT DOCUMENTS

CN    101187744 A    12/2007
CN    101738774 A     6/2010
(Continued)

*Primary Examiner* — Charles Chang
(74) *Attorney, Agent, or Firm* — Andrew C. Cheng

(57) ABSTRACT

The disclosure discloses a liquid crystal display, a liquid crystal display panel and a manufacture method thereof. The manufacture method includes producing a first auxiliary base and a second auxiliary base respectively, aligning and assembling the first auxiliary base and the second auxiliary base to form a liquid crystal cell, attaching reinforcement bases on a top surface and a bottom surface of the liquid crystal cell. A total thickness of the first auxiliary base and the second auxiliary base is D, a total thickness of a first standard auxiliary base and a second standard auxiliary of a standard liquid crystal display panel met a minimum structural strength requirement is defined as d, D is less than d. Which can reduce the thickness of the liquid crystal display panel to achieve an ultrathin structure of the liquid crystal display panel.

12 Claims, 6 Drawing Sheets

(51) Int. Cl.
*G02F 1/1335* (2006.01)
*G02F 1/1362* (2006.01)

(52) U.S. Cl.
CPC .. *G02F 1/133514* (2013.01); *G02F 1/133528* (2013.01); *G02F 1/1362* (2013.01); *G02F 2001/133354* (2013.01)

(58) Field of Classification Search
USPC .......................................................... 349/158
See application file for complete search history.

(56) References Cited

FOREIGN PATENT DOCUMENTS

| | | |
|---|---|---|
| CN | 102540563 A | 7/2012 |
| CN | 102809852 A | 12/2012 |
| CN | 202710880 U | 1/2013 |
| JP | 2008225401 A | 9/2008 |

\* cited by examiner

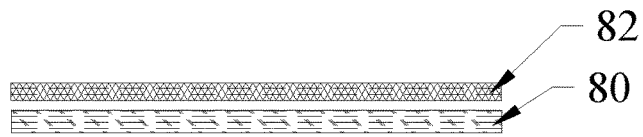

FIG. 6c

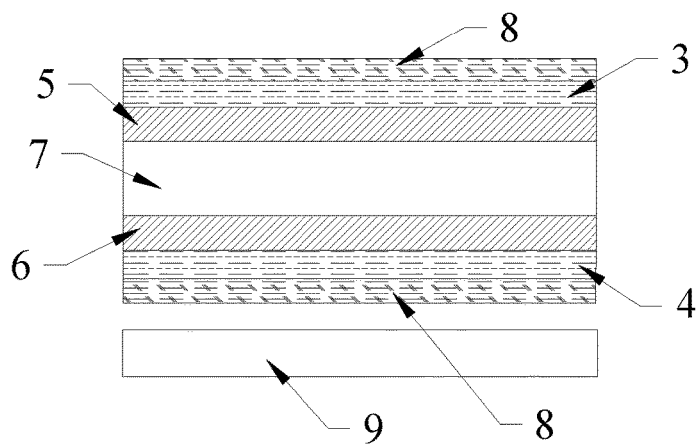

FIG. 7

| The reinforcement base adjacent to a non-display side of the liquid crystal display panel in the reinforcement bases extending below a bonding region of the liquid crystal display panel | S105 |

| The reinforcement base adjacent to the non-display side of the liquid crystal display panel in the reinforcement bases non-extending below the bonding region of the liquid crystal display panel | S106 |

| The reinforcement base adjacent to the non-display side of the liquid crystal display panel in the reinforcement bases non-extending below the bonding region of the liquid crystal display panel, a circuit control system of the bonding region and a flexible base detouring to the non-display side of the liquid crystal display panel | S107 |

FIG. 8

LIQUID CRYSTAL DISPLAY, LIQUID CRYSTAL DISPLAY PANEL AND MANUFACTURE METHOD THEREOF

TECHNICAL FIELD

The disclosure relates to a liquid crystal display technical field, and more particularly to a liquid crystal display, a liquid crystal display panel and a manufacture method thereof.

DESCRIPTION OF RELATED ART

A liquid crystal display panel gradually becomes one of the most rapidly developed display panels due to advantages such as lightweight and thinness, the liquid crystal display panel has been applied in various situations of life and work, the liquid crystal display panel is configured in various products such as a computer monitor, a medical monitor, a television, a billboard, a laser printer, a telephone, a mobile phone, a personal digital assistant (PDA), a digital camera, a camcorder, a large-scaled wall, a screen in a theater or a gymnasium, or a signboard. The liquid crystal display panel is developed towards portability, providing an ultrathin liquid crystal display panel has a practical meaning.

SUMMARY

Accordingly, the disclosure provides a liquid crystal display, a liquid crystal display panel and a manufacture method thereof, which can reduce a thickness of the liquid crystal display panel to achieve an ultrathin structure of the liquid crystal display panel.

To solve the technical problem above, the disclosure provides a liquid crystal display, the liquid crystal display includes a liquid crystal display panel and a backlight module that are stacked, the liquid crystal display panel includes a first auxiliary base and a second auxiliary base.

The first auxiliary base and the second auxiliary base are aligned and assembled to form a liquid crystal cell.

A top surface and/or a bottom surface of the liquid crystal cell are attached with reinforcement bases.

A total thickness of the first auxiliary base and the second auxiliary base is D, a total thickness of a first standard auxiliary base and a second standard auxiliary base of a standard liquid crystal display panel met a minimum structural strength requirement is defined as d, D is less than d.

The liquid crystal display panel further includes polarizers. The polarizers are attached on the top surface and the bottom surface of the liquid crystal cell, the reinforcement bases and the polarizers are attached, or the polarizers and the reinforcement bases are formed integrally. The reinforcement bases, the first auxiliary base and the second auxiliary base are combined to make the liquid crystal display panel to meet the minimum structural strength requirement.

The liquid crystal display panel further includes a color filter layer, an array layer and a liquid crystal layer.

The color filter layer is disposed on a surface of the first auxiliary base towards the second auxiliary base, the array layer is disposed on a surface of the second auxiliary base towards the first auxiliary base.

Or the color filter layer disposed on the surface of the second auxiliary base towards the first auxiliary base, the array layer disposed on the surface of the first auxiliary base towards the second auxiliary base.

The liquid crystal layer is disposed between the color filter layer and the array layer.

The reinforcement base in the reinforcement bases adjacent to a non-display side of the liquid crystal display panel extends below a bonding region of the liquid crystal display panel.

Or the reinforcement base in the reinforcement bases adjacent to the non-display side of the liquid crystal display panel does not extend below the bonding region of the liquid crystal display panel.

Or the reinforcement base in the reinforcement bases adjacent to the non-display side of the liquid crystal display panel does not extend below a bonding region of the liquid crystal display panel. A circuit control system of the bonding region and a flexible base detour to the non-display side of the liquid crystal display panel.

Another embodiment of the disclosure provides a manufacture method of a liquid crystal display panel, including producing a first auxiliary base and a second auxiliary base on a first auxiliary substrate and a second auxiliary substrate respectively, aligning and assembling the first auxiliary base and the second auxiliary base to form a liquid crystal cell, separating the liquid crystal cell from the first auxiliary substrate and the second auxiliary substrate respectively, attaching reinforcement bases on a top surface and/or a bottom surface of the liquid crystal cell.

A total thickness of the first auxiliary base and the second auxiliary base is D, a total thickness of a first standard auxiliary base and a second standard auxiliary base of a standard liquid crystal display panel met the minimum structural strength requirement is defined as d, D is less than d.

It further includes attaching polarizers on the top surface and the bottom surface of the liquid crystal cell.

The reinforcement bases and the polarizers are attached, or the polarizers and the reinforcement bases are formed integrally. The reinforcement base, the first auxiliary base and the second auxiliary base are combined to make the liquid crystal display panel to meet the minimum structural strength requirement.

Aligning and assembling the first auxiliary base and the second auxiliary base include producing a color filter layer on the first auxiliary base, producing an array layer on the second auxiliary base, aligning and assembling the first auxiliary base and the second auxiliary base, dropping a liquid crystal in between the color filter layer and the array layer, or producing the color filter layer on the second auxiliary base, producing the array layer on the first auxiliary base, aligning and assembling the first auxiliary base and the second auxiliary base, dropping the liquid crystal in between the color filter layer and the array layer.

It further includes the reinforcement base in the reinforcement bases adjacent to a non-display side of the liquid crystal display panel extending below a bonding region of the liquid crystal display panel, or the reinforcement base in the reinforcement bases adjacent to the non-display side of the liquid crystal display panel non-extending below the bonding region of the liquid crystal display panel; or the reinforcement base in the reinforcement bases adjacent to the non-display side of the liquid crystal display panel non-extending below the bonding region of the liquid crystal display panel, a circuit control system of the bonding region and a flexible base detouring to the non-display side of the liquid crystal display panel.

The first auxiliary base and the second auxiliary base are both flexible insulating bases.

Another embodiment of the disclosure provides a liquid crystal display panel, including a first auxiliary base and a second auxiliary base.

The first auxiliary base and the second auxiliary base are aligned and assembled to form a liquid crystal cell.

A top surface and/or a bottom surface of the liquid crystal cell is attached with reinforcement bases.

A total thickness of the first auxiliary base and the second auxiliary base is D, a total thickness of a first standard auxiliary base and a second standard auxiliary base of a standard liquid crystal display panel met the minimum structural strength is defined to be d, D is less than d.

It further includes polarizers. The polarizers are attached on the top surface and the bottom surface of the liquid crystal cell, the reinforcement bases and the polarizers are attached, or the polarizers and the reinforcement bases are formed integrally. The reinforcement bases, the first auxiliary base and the second auxiliary base are combined to make the liquid crystal display panel to meet the minimum structural strength requirement.

It further includes a color filter layer, an array layer and a liquid crystal layer.

The color filter layer is disposed on a surface of the first auxiliary base towards the second auxiliary base, the array layer is disposed on a surface of the second auxiliary base towards the first auxiliary base.

Or the color filter layer is disposed on the surface of the second auxiliary base towards the first auxiliary base. The array layer is disposed on the surface of the first auxiliary base towards the second auxiliary base.

The liquid crystal layer is disposed between the color filter layer and the array layer.

The reinforcement base in the reinforcement bases adjacent to a non-display side of the liquid crystal display panel extends below a bonding region of the liquid crystal display panel.

Or the reinforcement base in the reinforcement bases adjacent to the non-display side of the liquid crystal display panel does not extend below the bonding region of the liquid crystal display panel.

Or the reinforcement base in the reinforcement bases adjacent to the non-display side of the liquid crystal display panel does not extend below the bonding region of the liquid crystal display panel, a circuit control system of the bonding region and a flexible base both detour to the non-display side of the liquid crystal display panel.

Beneficial effects of the disclosure are as follows. According to the liquid crystal display, the liquid crystal display panel and the manufacture method thereof in embodiments of the disclosure, the manufacture method is producing the first auxiliary base and the second auxiliary base on the first auxiliary substrate and the second auxiliary substrate respectively, aligning and assembling the first auxiliary base and the second auxiliary base to form the liquid crystal cell, separating the liquid crystal cell from the first auxiliary substrate and the second auxiliary substrate respectively, attaching the reinforcement bases on the top surface and the bottom surface of the liquid crystal cell. The total thickness of the first auxiliary base and the second auxiliary base is D, a total thickness of a standard top base and a standard bottom base of the standard liquid crystal display panel met the minimum structural strength is defined to be d, D is less than d. The total thickness of the liquid crystal display panel according to the manufacture methods of the embodiments of the disclosure is less than a total thickness of a corresponding standard liquid crystal display panel. As existence of the reinforcement bases, the strength of the liquid crystal display panel obtained by the manufacture method of the embodiments of the disclosure can meet the requirement, or the strength of the liquid crystal display panel obtained by the manufacture method of the embodiments of the disclosure is no less than the strength of the corresponding standard liquid crystal display panel. The liquid crystal display panel provided by the disclosure can reduce the thickness of the liquid crystal display panel to achieve an ultrathin structure of the liquid crystal display panel.

BRIEF DESCRIPTION OF THE DRAWINGS

FIG. 6a-FIG. 6c are structural schematic views of reinforcement bases in a liquid crystal display panel according to an embodiment of the disclosure.

FIG. 7 is a structural schematic view of a liquid crystal display according to an embodiment of the disclosure.

FIG. 8 is a schematic flow chart of a manufacture method of a liquid crystal display panel according to another embodiment of the disclosure.

DETAILED DESCRIPTION OF PREFERRED EMBODIMENTS

A liquid crystal display, a liquid crystal display panel and a manufacture method thereof provided by the disclosure will be illustrated in detail according to embodiments with reference to the accompanying drawings as follows for a person skilled in the art to better understand the disclosure. In the accompanying drawings, thicknesses of a layer and a region are exaggerated for clarifying devices. A same label represents a same component in the entire embodiments and figures.

Figure 1:
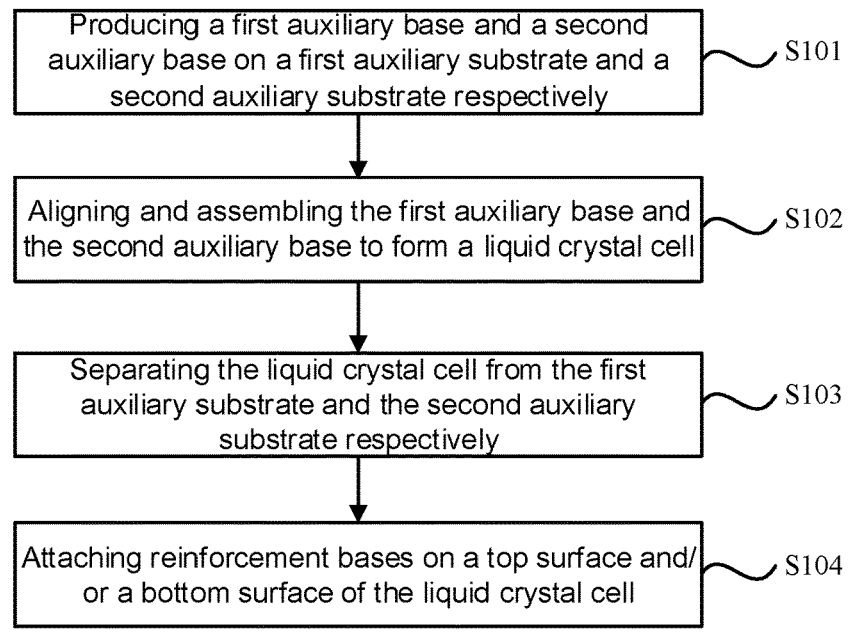
FIG. 1 is a schematic flow chart of a manufacture method of a liquid crystal display panel according to an embodiment of the disclosure.

Referring to FIG. 1, a manufacture method of a liquid crystal display panel according to an embodiment of the disclosure includes following steps.

Step S101, producing a first auxiliary base and a second auxiliary base on a first auxiliary substrate and a second auxiliary substrate respectively.

Figure 2:
FIG. 2 is a structural schematic view of the liquid crystal display panel in step S101 in FIG. 1.

Referring to FIG. 2, the first auxiliary substrate 1 and the second auxiliary substrate 2 are two separate support substrates, a first auxiliary base 3 and a second auxiliary base 4 are produced on the first auxiliary substrate 1 and the second auxiliary substrate 2 respectively.

The first auxiliary substrate 1 and the second auxiliary substrate 2 are material with sufficient hardness for a subsequent production of the liquid crystal display panel, such as glass, metal or ceramics. Moreover, the first auxiliary base 3 and the second auxiliary base 4 are insulating material of a thin film sort, which can be an inorganic thin film or an organic thin film, the inorganic thin film can be glass fiber, the organic thin film can be formed by polyimide (PI), polycarbonate (PC), polyether sulfone (PES), polyethylene terephthalate (PET), polyethylene naphthalate (PEN) or polyarylate (PAR), the first auxiliary base 3 and the second auxiliary base 4 can also be combination, superposition or mixture of the various inorganic thin films and/or organic thin films, inorganic material can be added in, the inorganic material can be nitride or oxide, such as $Si_3N_4$, $SiO_2$ or $Al_2O_3$, etc.

Producing the first auxiliary base 3 and the second auxiliary base 4 on the first auxiliary substrate 1 and the second auxiliary substrate 2 respectively is specifically coating the insulating material of a thin film sort on the first auxiliary substrate 1 and the second auxiliary substrate 2 by a coating process such as spin coating, slit coating, ink jet coating, etc., and drying and solidifying the insulating material by ultraviolet irradiation and/or heating to form the first auxiliary base 3 and the second auxiliary base 4. Optionally, the first auxiliary base 3 and the second auxiliary base 4 are flexible bases with multilayers formed by repeatedly coating and solidifying the insulating material on the first auxiliary substrate 1 and the second auxiliary substrate 2.

S102, aligning and assembling the first auxiliary substrate and the second auxiliary substrate to form a liquid crystal cell.

Figure 3:
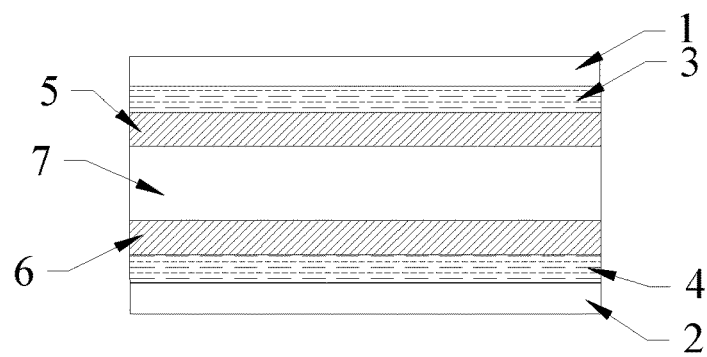
FIG. 3 is a structural schematic view of the liquid crystal display panel in step S102 in FIG. 1.

Referring to FIG. 3, a color filter layer 5 is produced on the first auxiliary base 3, an array layer 6 is produced on the second auxiliary base 4, a liquid crystal is dropped in a side of the first auxiliary base 3 adjacent to the color filter layer 5 or a side of the second auxiliary base 4 adjacent to the array layer 6, then the first auxiliary base 3 and the second auxiliary base 4 are aligned and assembled to form a liquid crystal cell shown in FIG. 3. The first auxiliary substrate 1 and the second auxiliary substrate 2 are still not separated on surfaces of the liquid crystal cell at the moment.

Moreover, it also can be producing the color filter layer 5 on the second auxiliary base 4, producing the array layer 6 on the first auxiliary base 3, dropping the liquid crystal in a side of the second auxiliary base 4 adjacent to the color filter layer 5 or a side of the first auxiliary base 3 adjacent to the array layer 6, then aligning and assembling the first auxiliary base 3 and the second auxiliary base 4 to form the liquid crystal cell.

S103, separating the liquid crystal cell from the first auxiliary substrate and the second auxiliary substrate respectively.

Figure 4:
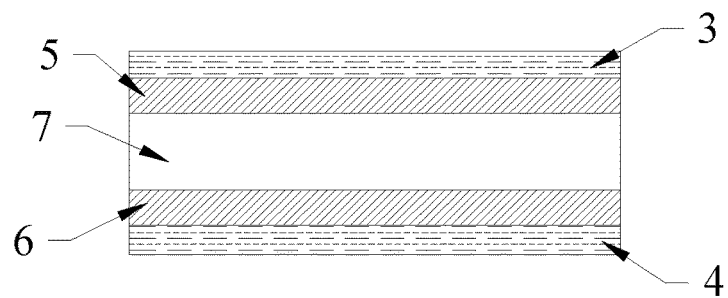
FIG. 4 is a structural schematic view of the liquid crystal display panel in step S103 in FIG. 1.

The first auxiliary substrate and the second auxiliary substrate are separated from the liquid crystal cell respectively to form the liquid crystal cell shown in FIG. 4, the liquid crystal cell contains the first auxiliary base 3, the color filter layer 5, a liquid crystal 7, the array layer 6 and the second auxiliary base 4 from top to bottom in sequence.

S104, attaching reinforcement bases on a top surface and/or a bottom surface of the liquid crystal cell.

Figure 5:
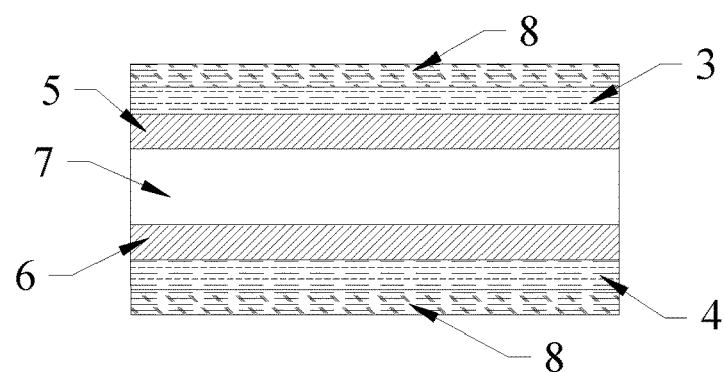
FIG. 5 is a structural schematic view of the liquid crystal display panel formed in step S104 in FIG. 1.

According to the liquid crystal cell formed in step S103, the first auxiliary base 3 and the second auxiliary base 4 are both flexible bases, or rigid bases, as strength of the liquid crystal cell is low, the reinforcement bases configured to reinforce the strength of the liquid crystal cell are attached on the top surface and/or bottom surface formed in step S103, the reinforcement base is a transparent structure such as thin glass, or transparent thin film material with certain strength. As shown in FIG. 5, in the embodiment, a reinforcement base 8 is a polarizing layer, a polarizing layer with high strength is as the reinforcement base 8. The liquid crystal cell shown in FIG. 5 is a situation that the top and bottom surfaces are both attached with the reinforcement bases 8, the liquid crystal display panel contains the reinforcement base 8, the first auxiliary base 3, the color filter layer 5, the liquid crystal 7, the array layer 6, the second auxiliary base 4 and the reinforcement base 8 from top to bottom in sequence, the polarizing layer with high strength configured to be the reinforcement base 8 can make it unnecessary for the produced liquid crystal display panel to be added a layer of reinforcement layer for enhancing the strength of the liquid crystal cell, and ensure the strength of the liquid crystal display panel produced according to the manufacture method of a liquid crystal display panel of the embodiment of the disclosure to meet the requirement, the thickness of the liquid crystal display panel is reduced simultaneously.

Figure 6A:
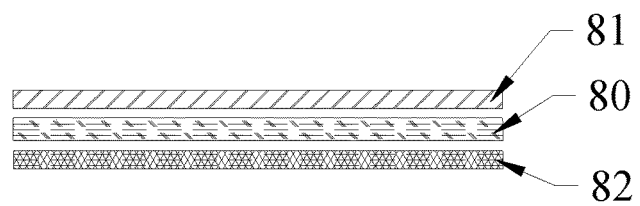
Figure 6B:
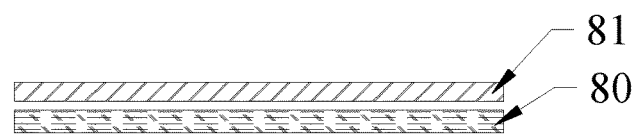

As shown in FIGS. 6a-6c, a polarizing layer 80 as the reinforcement base 8 can have a first protecting layer 81 and/or a second protecting layer 82, the first protecting layer 81 and the second protecting layer 82 are both thin and transparent material, the thin and transparent material of the first protecting layer 81 and the second protecting layer 82 can be identical or not, the thin and transparent material can be thin glass, a TAC film, a PET film, a COP film or a FRP film, etc. FIG. 6a indicates that two sides of the polarizing layer 80 as the reinforcement layer 8 respectively have the first protecting layer 81 and the second protecting layer 82. FIGS. 6b-6c indicate that top of the polarizing layer 80 as the reinforcement layer 8 has the first protecting layer 81 or the second protecting layer 82, the first protecting layer 81 or the second protecting layer 82 can also be disposed below the polarizing layer 80.

A backlight system 9 is assembled on a non-display side (a side adjacent to the array layer 6) of the liquid crystal display panel shown in FIG. 5 to obtain the liquid crystal display consist of the liquid crystal display panel produced by the manufacture method of a liquid crystal display panel according to the embodiment of the disclosure, shown as FIG. 7.

Another embodiment of the liquid crystal display panel of the disclosure is as shown in FIG. 8, the embodiment is improved based on the embodiment shown in FIG. 1, after step S104 it further includes:

S105, the reinforcement base 8 adjacent to a non-display side of the liquid crystal display panel in the reinforcement bases 8 extending below a bonding region of the liquid crystal display panel.

S106, the reinforcement base 8 adjacent to the non-display side of the liquid crystal display panel in the reinforcement bases 8 non-extending below the bonding region of the liquid crystal display panel.

S107, the reinforcement base 8 adjacent to the non-display side of the liquid crystal display panel in the reinforcement bases 8 non-extending below the bonding region of the liquid crystal display panel, a circuit control system 10 of the bonding region and a flexible base detouring to the non-display side of the liquid crystal display panel.

Figure 9A:
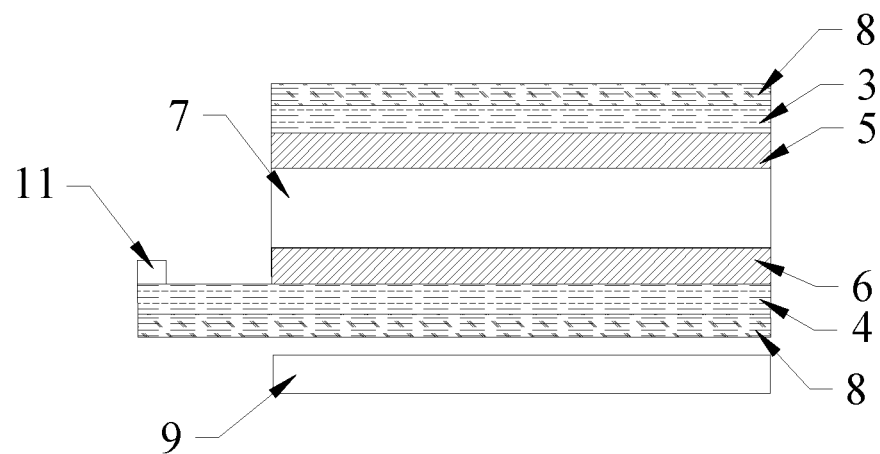
FIG. 9a-FIG. 9c are structural schematic views of a liquid crystal display panel according to another embodiment of the disclosure.
Figure 9B:
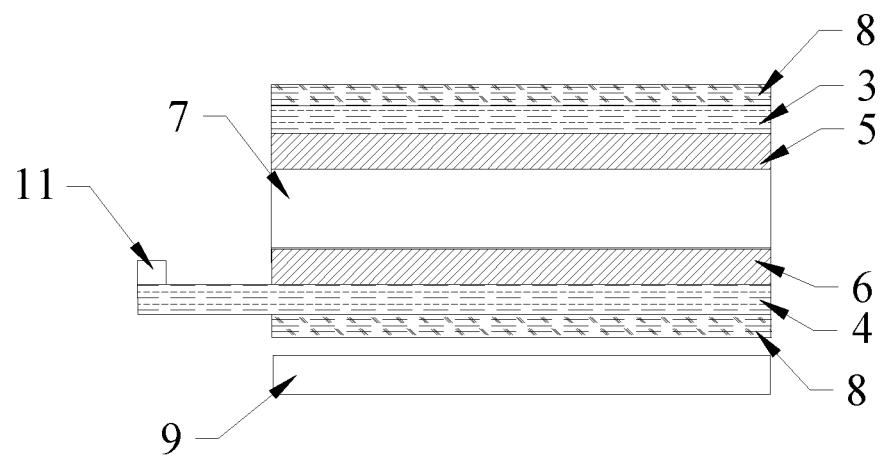
Figure 9C:
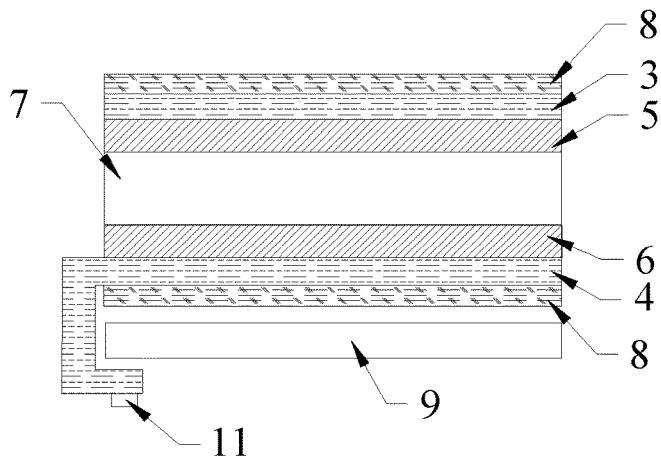

Step S105, step S106 and step S107 are manufacture methods of the reinforcement bases on the bonding region of the liquid crystal display panel. One of step S105, step S106 and step S107 is selected to be processed. Referring to FIG. 9a, FIG. 9b and FIG. 9c, as shown in FIG. 9a, it is a structural schematic view of the liquid crystal display panel when the reinforcement base 8 adjacent to the non-display side of the liquid crystal display panel in the reinforcement bases 8 extends below the bonding region of the liquid crystal display panel. As shown in FIG. 9b, it is a structural schematic view of the liquid crystal display panel when the reinforcement base 8 adjacent to the non-display side of the liquid crystal display panel in the reinforcement bases 8 does not extend below the bonding region of the liquid crystal display panel. As shown in FIG. 9c, it is a structural schematic view of the liquid crystal display panel when the reinforcement base 8 adjacent to the non-display side of the liquid crystal display panel in the reinforcement bases 8 does not extend below the bonding region of the liquid crystal display panel, a circuit control system 11 of the bonding region and a flexible base both detour to the non-display side of the liquid crystal display panel, the liquid crystal display panel configured to a display terminal can reduce an area of the non-display region on a surface of the display terminal, so as to improve a screen percentage of the display terminal and a display area on the display terminal correspondingly.

A total thickness of the first auxiliary base 3 and the second auxiliary base 4 is D, a total thickness of a standard top base and a standard bottom base of the standard liquid crystal display panel met a minimum structural strength requirement is defined to be d, D is less than d. Therefore, the total thickness of the liquid crystal display panel according to the embodiment of the disclosure is less than a total thickness of a corresponding standard liquid crystal display panel. As existence of the reinforcement bases, the strength of the liquid crystal display panel formed accordingly to the embodiment of the disclosure meets the requirement, which is no less than the strength of the corresponding standard liquid crystal display panel. The standard liquid crystal display panel indicates one produced by a conventional technique correspondingly to the embodiment of the disclosure, the standard top base and the standard bottom base both indicate ones of the liquid crystal display panel produced by a conventional technique correspondingly to the embodiment of the disclosure.

Figure 10:
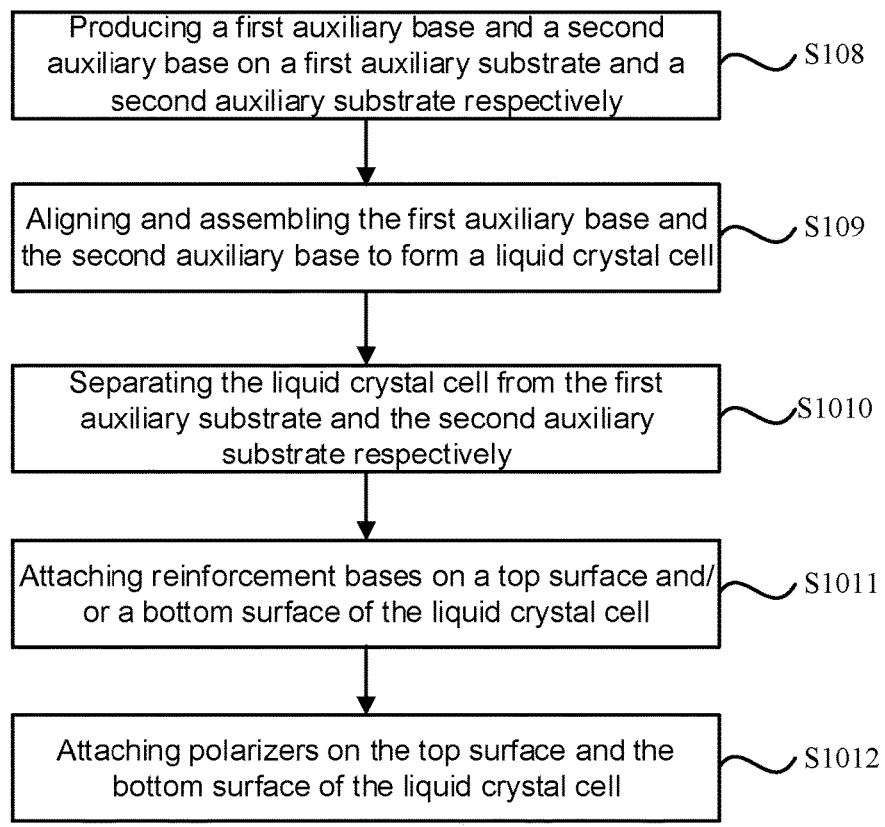
FIG. 10 is a schematic flow chart of a manufacture method of a liquid crystal display panel according to another embodiment of the disclosure.
Figure 11:
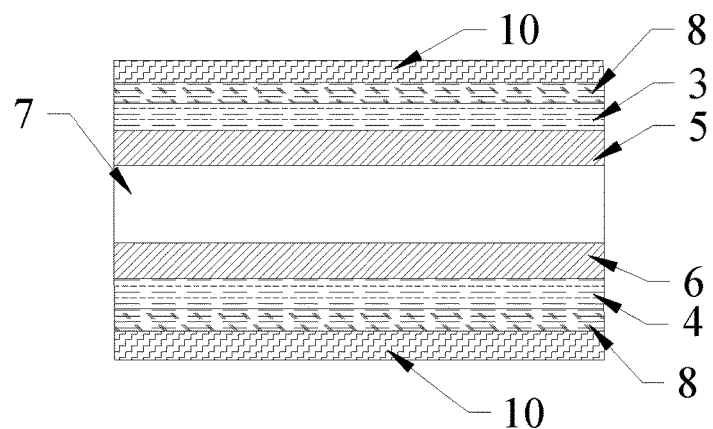
FIG. 11 is a structural schematic view of a liquid crystal display panel according to another embodiment of the disclosure.

A manufacture method of the liquid crystal display panel according to another embodiment of the disclosure is as shown in FIG. 10, FIG. 11 is a structural schematic view of a liquid crystal display panel according to another embodiment of the disclosure.

Referring to FIG. 10, the manufacture method of a liquid crystal display panel according to another embodiment of the disclosure includes following steps.

S108, producing the first auxiliary base 3 and the second auxiliary base 4 on the first auxiliary substrate 1 and the second auxiliary substrate 2 respectively.

S109, aligning and assembling the first auxiliary base 3 and the second auxiliary base 4 to form the liquid crystal cell.

S1010, separating the liquid crystal cell from the first auxiliary substrate 1 and the second auxiliary substrate 2 respectively.

S1011, attaching the reinforcement bases on the top surface and the bottom surface of the liquid crystal cell.

S1012, attaching the polarizers 8 on the top surface and the bottom surface of the liquid crystal cell.

The steps S108, S109 and S1010 are identical to the steps S101, S102 and S103 respectively in the embodiment shown in FIG. 1, repeated description is omitted here.

The reinforcement bases attached on the top and bottom surfaces of the liquid crystal cell in step S1011 in the embodiment are not polarizing layers.

The polarizers 8 are attached on the top and bottom surfaces of the liquid crystal cell produced in step S1012 to obtain the liquid crystal display panel as shown in FIG. 11.

Referring to FIG. 11, the liquid crystal display panel contains the polarizer 10, the reinforcement base 8, the first auxiliary base 3, the color filter layer 5, the liquid crystal 7, the array layer 6, the second auxiliary base 4, the reinforcement base 8 and the polarizer 10 from top to bottom in sequence.

Optionally, the polarizers 10 in the embodiment are similar with the reinforcement base 8 in the embodiment shown in FIG. 1, which are transparent material of a side with a protecting layer or both sides with protecting layers, referring to FIG. 6a, FIG. 6b and FIG. 6c.

The manufacture method of the polarizer 10 adjacent to the non-display side of the liquid crystal display panel in the polarizers 10 and the reinforcement bases 8 on the bonding region of the liquid crystal display panel is identical to the manufacture method shown in FIG. 9a, FIG. 9b and FIG. 9c, more information is ignored.

Figure 12:
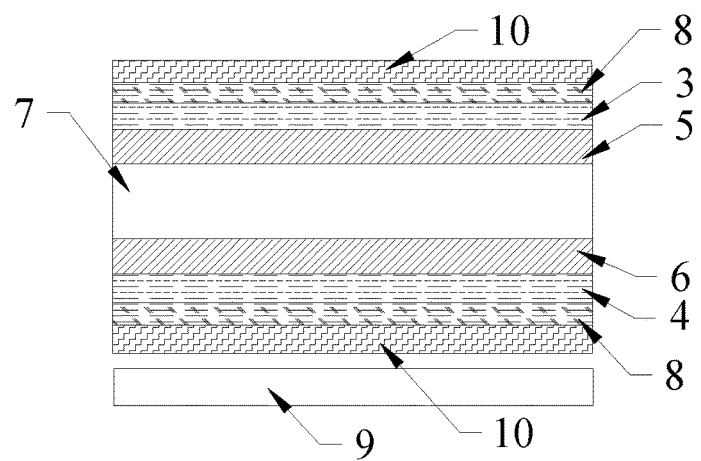
FIG. 12 is a structural schematic view of a liquid crystal display according to another embodiment of the disclosure.

The backlight system 9 is assembled on the non-display side (a side adjacent to the array layer 6) of the liquid crystal display panel shown in FIG. 11 to obtain the liquid crystal display produced by the manufacture method of a liquid crystal display panel according to the embodiment of the disclosure, shown as FIG. 12.

The liquid crystal display panel provided by the embodiment of the disclosure can be configured in a reflective display, a semi-transparent reflective display, a transmission display or other types of displays, a structure of the liquid crystal display panel provided by the embodiments of the disclosure can be configured in a liquid crystal display panel of FFS, IPS, TN, VA or a blue phase liquid crystal display, etc. Moreover, the liquid crystal display panel provided by the embodiment of the disclosure can be produced by other manufacture methods and processes.

In the embodiment of the disclosure, the total thickness of the first auxiliary base 3, the second auxiliary base 4, the reinforcement bases 8 and the polarizers 10 is D, the total thickness of the standard top base and the standard bottom base of the standard liquid crystal display panel met the minimum structural strength requirement is defined as d, D is less than d. Therefore, the total thickness of the liquid crystal display panel according to the embodiment of the disclosure is less than a total thickness of a corresponding standard liquid crystal display panel. As existence of the reinforcement bases, the strength of the liquid crystal display panel formed accordingly to the embodiment of the disclosure meets the requirement, which is no less than the strength of the corresponding standard liquid crystal display panel. The standard liquid crystal display panel indicates one produced by a conventional technique correspondingly to the embodiment of the disclosure, the standard top base and the standard bottom base indicate ones of the liquid crystal display panel produced by a conventional technique correspondingly to the embodiment of the disclosure.

Above are merely embodiments of the disclosure, which do not limit the protection scope of the disclosure. Any equivalent structure or process according to the disclosure and the figures, or application in other relative fields directly or indirectly should be covered by the protected scope of the disclosure.

What is claimed is:

1. A liquid crystal display, comprising a liquid crystal display panel and a backlight module that are stacked, wherein the liquid crystal display panel comprises:
   a first auxiliary base and a second auxiliary base, the first auxiliary base and the second auxiliary base being flexible bases with multilayers formed by repeatedly coating and solidifying insulating thin films on a first auxiliary substrate and a second auxiliary substrate; the first auxiliary substrate and the second auxiliary substrate being separated from the first auxiliary base and the second auxiliary base such that the liquid crystal display does not comprise the first auxiliary substrate and the second auxiliary substrate;

wherein the first auxiliary base and the second auxiliary base are aligned and assembled to form a liquid crystal cell;

a top surface and/or a bottom surface of the liquid crystal cell is attached with reinforcement bases configured to reinforce a strength of the liquid crystal cell;

a total thickness of the first auxiliary base and the second auxiliary base is D, a total thickness of a first standard auxiliary base and a second standard auxiliary base of a standard liquid crystal display panel met a minimum structural strength requirement defined to be d, D is less than d;

wherein the liquid crystal display panel further comprises polarizers; the polarizers are attached on the top surface and the bottom surface of the liquid crystal cell, the reinforcement bases and the polarizers are attached, or the polarizers and the reinforcement bases are formed integrally, the reinforcement bases, the first auxiliary base and the second auxiliary base are combined to make the liquid crystal display panel to meet the minimum structural strength requirement;

wherein the liquid crystal display panel further comprises a color filter layer, an array layer and a liquid crystal layer;

the color filter layer is disposed on a surface of the first auxiliary base towards the second auxiliary base, the array layer is disposed on a surface of the second auxiliary base towards the first auxiliary base; or the color filter layer is disposed on the surface of the second auxiliary base towards the first auxiliary base, the array layer is disposed on the surface of the first auxiliary base towards the second auxiliary base;

the liquid crystal layer is disposed between the color filter layer and the array layer.

2. The liquid crystal display according to claim 1, wherein the second auxiliary base is adjacent to a non-display side of the liquid crystal display panel, and extends into a bonding region of the liquid crystal display panel;

the reinforcement base adjacent to the first auxiliary base does not extend into the bonding region of the liquid crystal display panel, a circuit control system of the bonding region and a flexible base detouring to the non-display side of the liquid crystal display panel.

3. A manufacture method of a liquid crystal display panel, comprising:

producing a first auxiliary base and a second auxiliary base on a first auxiliary substrate and a second auxiliary substrate respectively;

aligning and assembling the first auxiliary base and the second auxiliary base to form a liquid crystal cell;

separating the liquid crystal cell from the first auxiliary substrate and the second auxiliary substrate respectively, such that the liquid crystal display panel does not comprises the first auxiliary substrate and the second auxiliary substrate;

attaching reinforcement bases configured to reinforce a strength of the liquid crystal cell on a top surface and/or a bottom surface of the liquid crystal cell;

wherein a total thickness of the first auxiliary base and the second auxiliary base is D, a total thickness of a first standard auxiliary base and a second standard auxiliary base of a standard liquid crystal display panel met a minimum structural strength requirement is defined to be d, D is less than d;

wherein producing the first auxiliary base and the second auxiliary base on the first auxiliary substrate and the second auxiliary substrate respectively comprises: coating insulating thin films on the first auxiliary substrate and the second auxiliary substrate by a coating process, and drying and solidifying the insulating thin films by ultraviolet irradiation and/or heating to form the first auxiliary base and the second auxiliary base; wherein the first auxiliary base and the second auxiliary base being flexible bases with multilayers formed by repeatedly coating and solidifying insulating material.

4. The manufacture method according to claim 3, further comprising:

attaching polarizers on the top surface and the bottom surface of the liquid crystal cell;

wherein the reinforcement bases and the polarizers are attached, or the polarizers and the reinforcement bases are formed integrally, the reinforcement bases, the first auxiliary base and the second auxiliary base are combined to make the liquid crystal display panel to meet the minimum structural strength requirement.

5. The manufacture method according to claim 3, wherein aligning and assembling the first auxiliary base and the second auxiliary base comprise:

producing a color filter layer on the first auxiliary base, producing an array layer on the second auxiliary base, aligning and assembling the first auxiliary base and the second auxiliary base, dropping a liquid crystal in between the color filter layer and the array layer; or producing the color filter layer on the second auxiliary base, producing the array layer on the first auxiliary base, aligning and assembling the first auxiliary base and the second auxiliary base, dropping a liquid crystal in between the color filter layer and the array layer.

6. The manufacture method according to claim 3, wherein the second auxiliary base is adjacent to a non-display side of the liquid crystal display panel, and extends into a bonding region of the liquid crystal display panel;

the reinforcement base adjacent to the first auxiliary base does not extend into the bonding region of the liquid crystal display panel, a circuit control system of the bonding region and a flexible base detouring to the non-display side of the liquid crystal display panel.

7. The liquid crystal display panel according to claim 6, wherein the second auxiliary base is adjacent to a non-display side of the liquid crystal display panel, and extends into a bonding region of the liquid crystal display panel;

the reinforcement base adjacent to the first auxiliary base does not extend into the bonding region of the liquid crystal display panel, a circuit control system of the bonding region and a flexible base detouring to the non-display side of the liquid crystal display panel.

8. The manufacture method according to any one of claims 3 to 6, wherein the first auxiliary base and the second auxiliary base are flexible insulating bases.

9. A liquid crystal display panel, comprising:

a first auxiliary base and a second auxiliary base; the first auxiliary base and the second auxiliary base being flexible bases with multilayers formed by repeatedly coating and solidifying insulating thin films on a first auxiliary substrate and a second auxiliary substrate; the first auxiliary substrate and the second auxiliary substrate being separated from the first auxiliary base and the second auxiliary base such that the liquid crystal display does not comprise the first auxiliary substrate and the second auxiliary substrate;

wherein the first auxiliary base and the second auxiliary base are aligned assembled to form a liquid crystal cell;

a top surface and/or a bottom surface of the liquid crystal cell is attached with reinforcement bases configured to reinforce a strength of the liquid crystal cell;

a total thickness of the first auxiliary base and the second auxiliary base is D, a total thickness of a first standard auxiliary base and a second standard auxiliary base of a standard liquid crystal display panel met a minimum structural strength requirement defined to be d, D is less than d.

10. The liquid crystal display panel according to claim 9, wherein it further comprises polarizers; the polarizers are attached on the top surface and the bottom surface of the liquid crystal cell, the reinforcement bases and the polarizers are attached, or the polarizers and the reinforcement bases are formed integrally, the reinforcement bases, the first auxiliary base and the second auxiliary base are combined to make the liquid crystal display panel to meet the minimum structural strength requirement.

11. The liquid crystal display panel according to claim 9, wherein it further comprises a color filter layer, an array layer and a liquid crystal layer;

the color filter layer disposed on a surface of the first auxiliary base towards the second auxiliary base, the array layer disposed on a surface of the second auxiliary base towards the first auxiliary base; or the color filter layer disposed on the surface of the second auxiliary base towards the first auxiliary base, the array layer disposed on the surface of the first auxiliary base towards the second auxiliary base;

the liquid crystal layer disposed between the color filter layer and the array layer.

12. The liquid crystal display panel according to claim 9, wherein the first auxiliary base and the second auxiliary base are formed by at least one inorganic thin film and/or at least one organic thin film; the inorganic thin film is glass fiber; the organic thin film is formed by materials selected from a group consisting of polyimide, polycarbonate, polyether sulfone, polyethylene terephthalate, polyethylene naphthalate and polyarylate.

* * * * *